United States Patent
Poon et al.

(10) Patent No.: US 10,809,392 B2
(45) Date of Patent: Oct. 20, 2020

(54) SYSTEM AND METHOD FOR AN INTERRUPT MODE ION CHAMBER

(71) Applicant: THERMO FISHER SCIENTIFIC INC., Sugar Land, TX (US)

(72) Inventors: King L. Poon, Sugar Land, TX (US); Alexander Joseph Esin, Sugar Land, TX (US); Alexei Kulik, Sugar Land, TX (US); Huichun Xing, Sugar Land, TX (US)

(73) Assignee: Thermo Fisher Scientific Inc., Sugar Land, TX (US)

(*) Notice: Subject to any disclaimer, the term of this patent is extended or adjusted under 35 U.S.C. 154(b) by 162 days.

(21) Appl. No.: 15/992,764

(22) Filed: May 30, 2018

(65) Prior Publication Data

US 2018/0364369 A1    Dec. 20, 2018

Related U.S. Application Data

(60) Provisional application No. 62/520,781, filed on Jun. 16, 2017.

(51) Int. Cl.
*G01T 1/185*    (2006.01)
*G01T 1/17*    (2006.01)

(52) U.S. Cl.
CPC .............. *G01T 1/185* (2013.01); *G01T 1/17* (2013.01)

(58) Field of Classification Search
None
See application file for complete search history.

(56) References Cited

U.S. PATENT DOCUMENTS

| | | | |
|---|---|---|---|
| 4,050,019 A * | 9/1977 | Nirschl | G01R 1/30 324/115 |
| 4,322,687 A | 3/1982 | Dwarakanath et al. | |
| 9,513,175 B2 | 12/2016 | Prendergast et al. | |
| 2014/0209811 A1* | 7/2014 | Chou | G01T 1/185 250/375 |

FOREIGN PATENT DOCUMENTS

| | | |
|---|---|---|
| GB | 1244936 A | 9/1971 |
| GB | 2149248 A | 6/1985 |

OTHER PUBLICATIONS

Popov et al., "Precision environmental radiation monitoring system," 2009 1st International Conference on Advancements in Nuclear Instrumentation, Measurement Methods and their Applications: ANIMMA 2009, Marseille, France, Jun. 7-10, 2009, IEEE, Piscataway. NJ, Jun. 7, 2009, pp. 1-7.

International Preliminary Report on Patentability for Application No. PCT/US2018/034307, dated Dec. 26, 2010.

* cited by examiner

*Primary Examiner* — Edwin C Gunberg
(74) *Attorney, Agent, or Firm* — William R. McCarthy, II

(57) ABSTRACT

An embodiment of a system is described that comprises an ionization chamber electrically coupled with a charge amplifier circuit by a reed switch. The reed switch of the embodiments described herein produces substantially no leakage current and electrically insulates the charge amplifier from the ionization chamber.

18 Claims, 5 Drawing Sheets

SYSTEM AND METHOD FOR AN INTERRUPT MODE ION CHAMBER

CROSS-REFERENCE TO RELATED APPLICATION

This application claims the benefit of U.S. provisional patent application No. 62/520,781, filed Jun. 16, 2017. The contents of this application is incorporated by reference in its entirety.

FIELD OF THE INVENTION

The present invention is generally directed to an improved ionization chamber and method of operation.

BACKGROUND

It is generally appreciated that ionization chambers are relatively simple and widely used for the detection and measurement of certain types of ionizing radiation that include X-rays, gamma rays, neutron, and beta particles. A typical embodiment of an ionization chamber collects charges created by ionization within a gas through the application of an electric field and exposure to ionizing radiation. Ionization chambers are known to operate reliably in challenging environments such as those with high degrees of vibration and/or temperature stress, and typically provide a uniform response over a wide range of energies. For example, ionization chambers are widely used in the nuclear power industry, research labs, radiography, radiobiology, and environmental monitoring due to their general accuracy and reliability characteristics especially in challenging environments. However, currently available ionization chamber designs generally perform poorly for measurement of very low current such as, for example, currents down to the femtoamphere (fA) range. Unlike proportional or Geiger counters, ionization chamber designs do not amplify signal internally or generate short pulses with relatively high current, which results in very low output current.

For example, ionization chambers have been used in the oil and gas industry for density measurement applications which need a minimum threshold of output current for reliable detection. Further, it is now typical in the oil and gas industry to employ pipes with a larger diameter and greater wall thickness than previously used to improve efficiency as well as reliability and safety. This has resulted in a decrease in the degree of signal available for measurement by an ionization chamber which can be about 10 times less than was previously available. Further, in some applications it is even more difficult to obtain accurate measurement in the fA range such as applications that are limited by the radiation source size that can be used (e.g. some sites are limited by the site license granted for the nuclear source, which can be in the range of about 200 millicurie (mCi)).

Therefore, there is a need for an improved design of measurement system that improves the signal quality and stability in a relatively simple and inexpensive manner.

SUMMARY

Systems, methods, and products to address these and other needs are described herein with respect to illustrative, non-limiting, implementations. Various alternatives, modifications and equivalents are possible.

An embodiment of a system is described that comprises an ionization chamber electrically coupled with a charge amplifier circuit by a reed switch. The reed switch of the embodiments described herein produces substantially no leakage current and electrically insulates the charge amplifier from the ionization chamber.

In some implementations the ionization chamber comprises a radiation source and in may be configured to measure currents down to about 10 fA that is important for certain types of measurement. Also, in some cases the charge amplifier includes a switch configured to reset a capacitor charge to about zero which may produce a charge injection at closing resulting in a non-zero capacitor charge. To cancel the effect of the non-zero capacitor charge, the charge amplifier may include an additional high-gain feedback loop.

Further, in some implementations, the charge amplifier comprises a range of gain of at least 1000, and may operate over a wide range of temperature such as a range of about $-40°$ C. to about $+75°$ C.

Also, an embodiment of a method of correcting a signal from an ionization chamber is described that comprises (a) opening a reed switch that electrically couples an ionization chamber to a charge amplifier to measure a background signal comprising a leakage current from the charge amplifier; (b) closing the reed switch to measure a total signal comprising the background signal and a signal from the ionization chamber; and (c) calculating a corrected signal by subtracting background signal from total signal.

In some implementations the method repeats steps (a)-(c) while a system is in operation. Also in the same or alternative embodiments, the leakage current comprises current from a switch and an amplifier.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 120 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention include an improved ionization chamber capable of measuring very low current. More specifically, the ionization chamber is enabled operate in challenging environments with a limited radiation source size.

Figure 1:
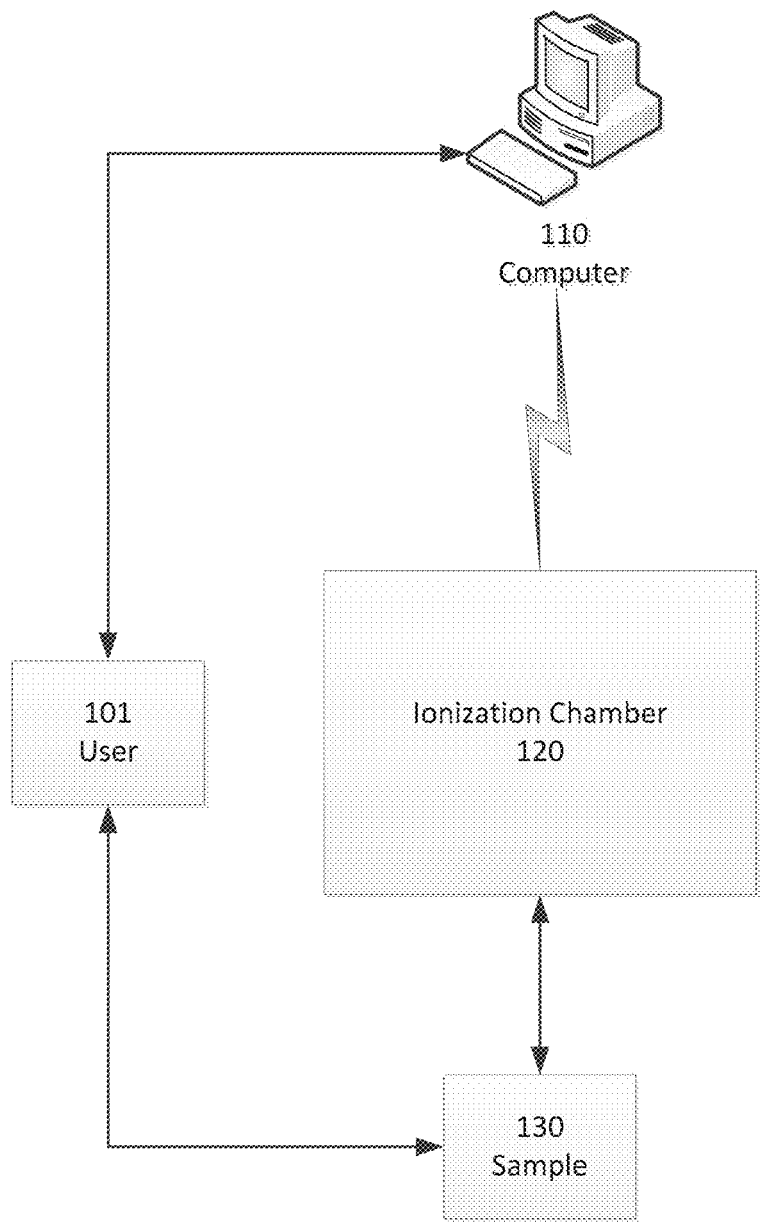
FIG. 1 is a simplified graphical representation of one embodiment of an ionization chamber and associated computer system.

FIG. 1 provides a simplified illustrative example of user 101 capable of interacting with computer 110, as well as a network connection between computer 110 and ionization chamber 120. FIG. 1 also illustrates sample 130, which may include a fluid sample (e.g. a gas or a liquid) contained within a pipe or other suitable receptacle. It will be appreciated that the example of FIG. 1 illustrates a direct network connection between the elements (e.g. including wired or wireless data transmission represented by a lightning bolt), however the exemplary network connection also includes indirect communication via other devices (e.g. switches, routers, controllers, computers, etc.) and therefore should not be considered as limiting.

Computer 110 may include any type of computing platform such as a workstation, a personal computer, a tablet, a "smart phone", a server, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many various types of networks well known to those of ordinary skill in the art. For example, a network may include a local or wide area network that employs what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As described above, embodiments of the presently described invention include an ionization chamber capable of accurately measuring very low current. A typical solution for measuring low current includes what is referred to as a "charge amplifier", also sometimes referred to as an "integrating transimpedance amplifier" that produces a voltage output proportional to the integrated value of the input current. A typical charge amplifier uses a reference capacitor to produce an output voltage, where a current (I) charges the capacitor (C) and over time even a very small current can generate a considerable voltage across the capacitor. Typical charge amplifiers also include a switch used to periodically reset the capacitor charge to about zero in order to prevent saturation. The output voltage from such a charge amplifier is given by the following formula:

$$V = \frac{1}{C} \int I(t) dt$$

Unfortunately, a typical charge amplifier generally produces some degree of what is referred to as "leakage current" which becomes problematic for measurement of low current. For example, the integrating capacitor of a typical charge amplifier discharges through both the amplifier input leakage and switch leakage. When measuring currents down to about 10 fA (e.g. a range may include 0.01-100 pA) the leakage current can become comparable to the signal of interest thus distorting the measurement considerably. Further, another significant aspect is that the leakage current is temperature-dependent. It is generally understood that as temperature increases most conventional switch embodiments employed with a charge amplifier (e.g. a semiconductor or other solid state switch embodiment) exhibit a substantial increase in leakage current with an increase in temperature both in positive and negative directions. In the present example, this is especially important in industrial applications where the equipment is expected to operate within a broad temperature range.

Figure 2:
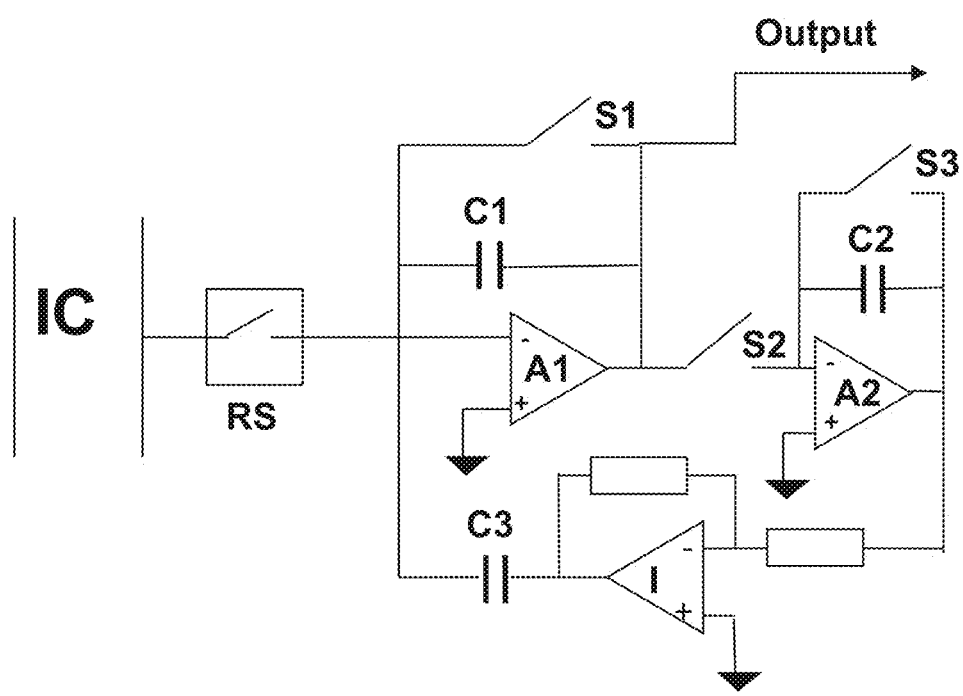
FIG. 2 is a simplified graphical representation of one embodiment of the ionization chamber of FIG. 1 and a charge amplifier circuit comprising a reed switch.

Embodiments of the presently described invention include a system and method for correcting the ion chamber reading for charge amplifier and switch leakage by accurately measuring the leakage and subtracting it from the total signal detected. FIG. 2 provides an illustrative example of a charge amplifier circuit associated with embodiments of ionization chamber 120. The circuit design includes charge amplifier (A1) electrically coupled to an ion chamber (IC) via what is referred to as a "reed-switch" (RS) (also sometimes referred to as a "reed relay"). In the embodiments described herein, an RS switch has highly desirable resistance characteristics that enable efficient electrical insulation of the amplifier A1 input from the IC which typical semiconductor or solid state switches cannot provide. For example, embodiments of an RS switch are hermetically sealed enabling operation in rugged environments and comprise a mechanical switch controlled by means of magnetic field that typically has a resistance more than 10-100 TΩ ($10^{13}$Ω). In the present example an RS switch may not be as fast as a semiconductor or other type of solid state switch, however an RS switch can respond on a millisecond time scale which is sufficient for use with an IC.

Figure 3:
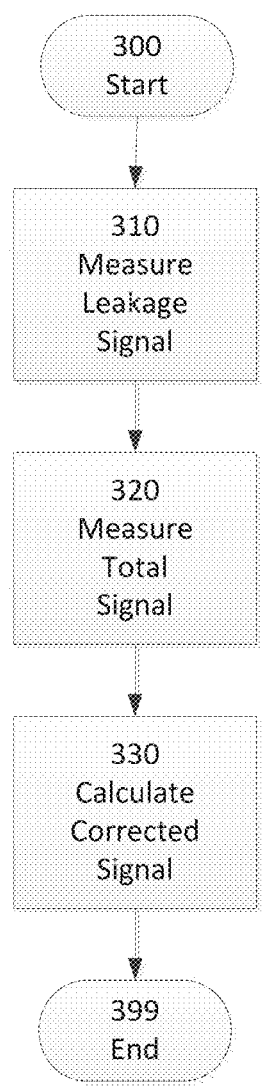
FIG. 3 is a functional block representation of one embodiment of a method for correcting a leakage signal from the charge amplifier circuit of FIG. 2.

Returning to the example of FIG. 2, with the RS switch open the amplifier A1 is disconnected from the IC and the output signal is entirely due to amplifier and S1 switch leakage (e.g. the S1 switch used to reset a capacitor charge to about zero). As illustrated in step 310 of FIG. 3, computer 110 receives and stores the output signal that includes a value representative of the degree of leakage signal (B). If a semiconductor switch is used in place of an RS switch, the ion chamber current will partially flow through the open switch thus distorting the value of (B). In other words, the RS switch stabilizes the measurement of (B) so that it is a consistent measure of the actual amplifier and S1 switch leakage.

When the RS switch is closed the output signal comprises total signal (A) that is the sum of the ion chamber current and leakage current. As illustrated in step 320 of FIG. 3, computer 110 receives the total signal (A) and, as illustrated in step 330 of FIG. 3, computes a corrected signal (I) by subtracting leakage signal (B) from total signal (A) (e.g. I=A−B).

Figure 4:
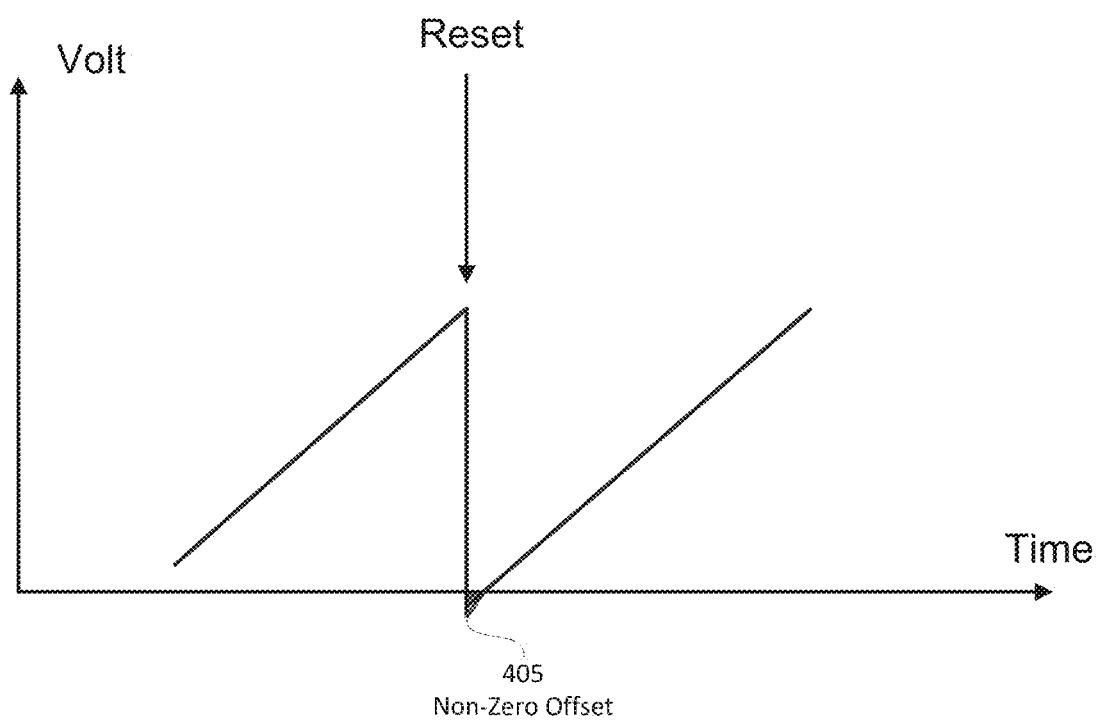
FIG. 4 is a simplified graphical representation of one embodiment of a non-zero offset value produced by a high gain feedback loop of the charge amplifier circuit of FIG. 2.

In the same or alternative embodiments the S1 switch may include a semiconductor switch that injects a small amount of charge into the circuit at closing that affects the amount of charge on the C1 capacitor which ideally should be about zero. As a result, for at least a short period of time after closing, the output charge from the S1 switch produces a degree of charge on the C1 capacitor that is different from zero. For example, in embodiments where the S1 switch produces a charge injection at closing, charging the C1 capacitor starts from a value associated with non-zero offset 405 as illustrated in FIG. 4. It will be appreciated that if an RS switch was also used for the S1 switch then the problem of current injection wouldn't exist.

In some embodiments of the described invention, a high-gain feedback loop is employed to cancel the effect of a residual charge on the C1 capacitor illustrated as non-zero offset 405. This feedback loop is active only during a short period of time immediately following the closure of the S1 switch, when the charge injection takes place. For example the high-gain feedback loop is controlled by the S2 switch. By closing the S2 switch the input of A1 is connected to its own output via high-gain amplifier A2 and thus forced to zero. Unlike C1, the C2 capacitor is charged by the output of a powerful A1 amplifier, so it can be chosen big enough to mitigate the effect of charge injection by the S3 switch. In the described example, C3 is a coupling and amplifier I is an inverter.

In some implementations of the described embodiments, computer 110 may utilize a repeating cycle of a first period of acquiring a leakage signal (B) and a second period of acquiring a total signal (A), however it will be appreciated that it does not necessarily need to occur in that order and that the specific time intervals for each period may vary depending on the desired behavior of the system. For example, in some embodiments computer 110 may use a 2 second time interval to acquire leakage signal (B) and a 6 second time interval to acquire total signal (A). In the present example computer 110 repeats the cycle during operation of the system.

In the described embodiments, since the correcting method is constantly correcting the total signal to remove the leakage signal produced by the charge amplifier, it also eliminating the temperature effect of the leakage current. In other words, the degree of leakage current may change with temperature as described above, however since the described invention specifically isolates and subtracts substantially all of the leakage current as leakage signal from the total signal it makes no difference that the degree of leakage current changes over time.

It will also be appreciated that the leakage current can also be cancelled by means of periodic change of ion chamber voltage polarity, however this method is limited to low voltage chambers which is unacceptable in certain applications. In the some embodiments a range of gain of at least 1000 is highly desirable. It will be appreciated that the term "gain" generally refers to a ratio of two quantities such as a measurement of the output of a circuit or component to its input. For example, gain applies to any units of measure utilized such as amps (e.g. current gain), volts (e.g. voltage gain), or other units. In the present example, a large range of gain on the order of 1000V can produce a precise density measurement over a broad range of pipe diameter and thickness. In some cases a voltage of 1500V can prevent a charge cloud forming at high chamber currents, such as for example a chamber current of up to 10 nA. It is typically very problematic to reverse polarity fast for such high voltage and thus the presently described embodiments provide significant advantages for correcting leakage current.

Examples

Figure 5:
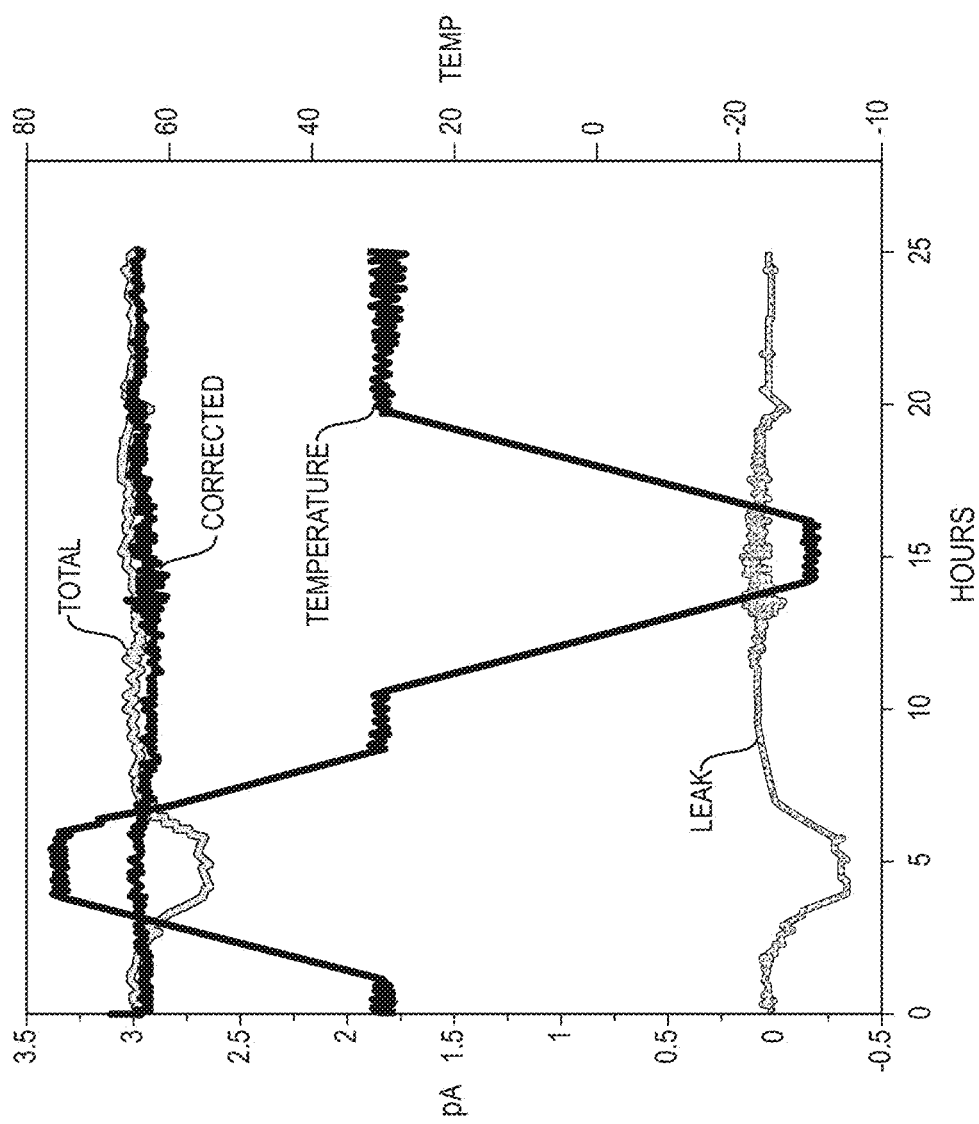
FIG. 5 is a simplified graphical representation of one embodiment of results obtained from a detector using the charge amplifier circuit of FIG. 2.

FIG. 5 provides an illustration of results obtained from a detector that was exposed to a 10 μCi $^{137}$Cs source at fixed geometry and temperature changing from about −40° C. to about +75° C. The temperature line over time is labeled as "Temperature", the leakage current line indicating background signal (B) is labeled as "Leak", the total signal (A) is labeled as "Total", and corrected signal (I) is labeled as "Corrected" and represents the difference between the first two. As the example of FIG. 5 illustrates, there is a change in the leakage current causing a background signal effect that occurs at an elevated temperature of about +75° C. (e.g. between 4-6 hours) which is subtracted out as evidenced by the total signal line.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments

What is claimed is:

1. A system, comprising:
   an ionization chamber;
   a charge amplifier circuit comprising an amplifier, an integrating capacitor, and a reset switch configured to reset a charge of on the integrating capacitor to about zero; and
   a reed switch that electrically couples the amplifier and the ionization chamber when closed, wherein the reed switch electrically insulates the ionization chamber when open; and
   a computer configured to receive an output signal from the charge amplifier circuit when 1) the reed switch is open, wherein the output signal comprises a leakage value that comprises a measure of leakage from the amplifier and the reset switch; and 2) when the reed switch is closed, wherein the output signal comprises a total signal value representative of a sum of current from the ion chamber and the leakage value, further wherein the computer is configured to compute a corrected signal value by subtracting the leakage signal from the total signal value.

2. The system of claim 1, wherein:
the reed switch produces substantially no leakage current.

3. The system of claim 1, wherein:
the ionization chamber is configured to measure currents down to about 10 fA.

4. The system of claim 1, wherein:
the ionization chamber comprises a radiation source.

5. The system of claim 1, wherein:
the reset switch produces a charge injection at closing resulting in a non-zero charge on the integrating capacitor.

6. The system of claim 5, wherein:
the charge amplifier circuit further comprises a high-gain feedback loop configured to cancel the effect of the non-zero capacitor charge.

7. The system of claim 1, wherein:
the charge amplifier circuit comprises a range of gain of at least 1000.

8. The system of claim 1, wherein:
the charge amplifier circuit operates over a wide range of temperature.

9. The system of claim 8, wherein:
the range of temperature comprises about −40° C. to about +75° C.

10. A method of correcting a signal from an ionization chamber, comprising:
(a) opening a reed switch to electrically insulate an ionization chamber from a charge amplifier circuit, wherein the charge amplifier circuit produces an output signal comprising a leakage value;
(b) closing the reed switch to electrically couple the ionization chamber to the charge amplifier circuit, wherein the charge amplifier circuit produces the output signal comprising a total signal value;
(c) receiving 1) the leakage value when the reed switch is open, wherein the leakage value comprises a measure of leakage from an amplifier and a reset switch configured to reset a charge on an integrating capacitor to about zero; and 2) the total signal value when the reed switch is closed, wherein the total signal value that comprises a sum of current from the ion chamber and the leakage value; and
(d) calculating a corrected signal by subtracting leakage value signal from total signal value.

11. The method of claim 10, further comprising:
repeating steps (a)-(d).

12. The method of claim 10, wherein: the reset switch produces a charge injection at closing resulting in a non-zero capacitor charge.

13. The method of claim 12, wherein:
the charge amplifier circuit further comprises a high-gain feedback loop configured to cancel the effect of the non-zero capacitor charge.

14. The method of claim 10, wherein:
the reed switch produces substantially no leakage current.

15. The method of claim 10, wherein:
the ionization chamber is configured to measure currents down to about 10 fA.

16. The method of claim 10, wherein:
the ionization chamber comprises a radiation source.

17. The method of claim 10, wherein:
the charge amplifier circuit operates over a wide range of temperature.

18. The method of claim 10, wherein:
the range of temperature comprises about −40° C. to about +75° C.

* * * * *